United States Patent
Park et al.

(10) Patent No.: US 11,716,453 B2
(45) Date of Patent: Aug. 1, 2023

(54) SIGNAL PROCESSING DEVICE AND IMAGE DISPLAY APPARATUS INCLUDING THE SAME

(71) Applicant: LG ELECTRONICS INC., Seoul (KR)

(72) Inventors: Kyeongryeol Park, Seoul (KR); Jinmo Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 16/831,109

(22) Filed: Mar. 26, 2020

(65) Prior Publication Data

US 2020/0329222 A1 Oct. 15, 2020

(30) Foreign Application Priority Data

Mar. 26, 2019 (KR) .......................... 10-2019-0034141

(51) Int. Cl.

| G06T 5/00 | (2006.01) |
| G06T 5/20 | (2006.01) |
| H04N 9/73 | (2023.01) |
| H04N 9/64 | (2023.01) |
| H04N 9/68 | (2023.01) |
| G09G 5/00 | (2006.01) |
| G09G 5/02 | (2006.01) |

(52) U.S. Cl.
CPC .............. *H04N 9/73* (2013.01); *G06T 5/007* (2013.01); *G06T 5/009* (2013.01); *G06T 5/20* (2013.01); *G09G 5/00* (2013.01); *G09G 5/02* (2013.01); *H04N 9/643* (2013.01); *H04N 9/646* (2013.01); *H04N 9/68* (2013.01); *G06T 2207/20208* (2013.01)

(58) Field of Classification Search
CPC combination set(s) only.
See application file for complete search history.

(56) References Cited

U.S. PATENT DOCUMENTS

| 10,652,512 B1* | 5/2020 | Ikizyan ................... G06F 17/11 |
| 2017/0061591 A1* | 3/2017 | Park ....................... G09G 3/2092 |
| 2017/0186141 A1 | 6/2017 | Ha et al. |
| 2019/0019277 A1* | 1/2019 | Chen ...................... H04N 5/202 |
| 2019/0279343 A1* | 9/2019 | Shin ......................... G09G 3/20 |
| 2020/0236270 A1* | 7/2020 | Pourreza Shahri ....... G06T 7/73 |

FOREIGN PATENT DOCUMENTS

| EP | 1400921 A2 | 3/2004 |
| KR | 10-2016-0040981 A | 4/2016 |
| WO | WO 2017/009182 A1 | 1/2017 |
| WO | WO 2018/031153 A1 | 2/2018 |

* cited by examiner

*Primary Examiner* — Matthew Salvucci
(74) *Attorney, Agent, or Firm* — Birch, Stewart, Kolasch & Birch, LLP

(57) ABSTRACT

Disclosed is a signal processing device and an image display apparatus including the same. The signal processing device includes: a linear tone mapper configured to perform linear tone mapping on a part of an input image; a non-linear tone mapper configured to perform non-linear tone mapping on another part of the input image; and a combiner configured to combine an output from the linear tone mapper and an output from the non-linear tone mapper. Accordingly, it is possible to map the dynamic range of an input image to a display.

17 Claims, 19 Drawing Sheets

SIGNAL PROCESSING DEVICE AND IMAGE DISPLAY APPARATUS INCLUDING THE SAME

CROSS-REFERENCE TO RELATED APPLICATION

This application claims the priority benefit of Korean Patent Application No. 10-2019-0034141, filed on Mar. 26, 2019 in the Korean Intellectual Property Office, the disclosure of which is incorporated herein by reference.

BACKGROUND OF THE INVENTION

1. Field of the Invention

The present invention relates to a signal processing device and an image display apparatus including the same, and more particularly to a signal processing device capable of mapping the dynamic range of an input image suitably for a display and an image display apparatus including the same.

2. Description of the Related Art

A signal processing device is a device that performs signal processing on an input image so as to display an image.

For example, the signal processing device may receive a broadcast signal or an HDMI signal, performs signal processing based on the received broadcast or HDMI signal, and output a processed image signal.

Meanwhile, with development of camera and broadcasting technologies, resolution and vertical synchronization frequencies of input images have improved as well. Specifically, there are increasing needs for image quality processing on an image having 4K resolution and 120 Hz vertical synchronization frequency.

Such image quality processing on an input image may be performed by a signal processing device. Accordingly, there are ongoing researches to study improved image quality processing by the signal processing device.

For example, there are ongoing researches to study displaying an image in a high dynamic range (HDR).

SUMMARY OF THE INVENTION

An object of the present invention is to provide a signal processing device capable of mapping the dynamic range of an input image suitably for a display and an image display apparatus including the same.

Another object of the present invention is to provide a signal processing device capable of reducing an amount of calculation for tone mapping, while improving low gray level expression, and an image display apparatus including the same.

In order to achieve the above objects, there are provided a signal processing device and an image display apparatus including the same according to an embodiment of the present invention, and the signal processing device includes: a linear tone mapper configured to perform linear tone mapping on a part of an input image; a non-linear tone mapper configured to perform non-linear tone mapping on another part of the input image; and a combiner configured to combine an output from the linear tone mapper and an output from the non-linear tone mapper.

The linear tone mapper may be configured to perform linear tone mapping on luminance equal to or higher than a first level, and the non-linear tone mapper may be configured to perform non-linear tone mapping on at least some luminance lower than the first level.

The signal processing device according to an embodiment of the present invention may further include a linear gamut mapper configured to perform linear gamut mapping on the input image, and the linear tone mapper may be configured to perform linear tone mapping on an output from the linear gamut mapper.

The signal processing device according to an embodiment of the present invention may further include an image analyzer configured to analyze the input image, a section to perform the non-linear tone mapping may vary based on a content type and a resolution of the analyzed image.

The first level may vary an input setting signal.

A level of output luminance after the non-linear tone mapping may increase as the first level increases.

A section to perform the non-linear tone mapping may increase as the first level increases.

The linear tone mapper may be configured to perform linear tone mapping on luminance equal to or higher a first level, and the non-linear tone mapper may be configured to perform non-linear tone mapping on luminance equal to or lower than a second level being lower than the first level.

The combiner may be configured to change luminance between the first level and the second level based on the non-linear tone mapping and the non-linear tone mapping.

In order to achieve the above objects, there are provided a signal processing device and an image display apparatus including the same according to another embodiment, and the signal processing device includes: a display; and a signal processing unit configured to display a first object capable of controlling linear tone mapping and non-linear tone mapping, perform the linear tone mapping and the non-linear tone mapping on an input image according to a value set based on the object, and perform control to display a combined image on the display.

The signal processing unit may be configured to: display a second object for turning on or off a mode of mixing of the linear tone mapping and the non-linear tone mapping; and, when the second object is selected, perform the linear tone mapping and the non-linear tone mapping on the input image according to a setting of the first object capable of controlling the linear tone mapping and the non-linear tone mapping, and perform control to display a combined image on the display.

The signal processing unit may be configured to increase a section to perform the non-linear tone mapping as a selection bar in the object is positioned closer to a non-linear tone mapping item than a linear tone mapping item.

A signal processing device and an image display apparatus including the same are proposed according to an embodiment of the present invention, and the signal processing device includes: a linear tone mapper configured to perform linear tone mapping on a part of an input image; a non-linear tone mapper configured to perform non-linear tone mapping on another part of the input image; and a combiner configured to combine an output from the linear tone mapper and an output from the non-linear tone mapper. Accordingly, it is possible to map a dynamic range of an input image suitably for the display. In particular, it is possible to reduce an amount of calculation for tone mapping while improving low gray level expression.

The linear tone mapper may be configured to perform the linear tone mapping on luminance equal to or higher than a first level, and the non-linear tone mapper may be configured to perform non-linear tone mapping on at least some luminance lower than the first level. Accordingly, it is possible to map a dynamic range of an input image suitably for the display.

The signal processing unit may further include a linear gamut mapper configured to perform linear gamut mapping on the input image, and the linear tone mapper may be configured to perform the linear tone mapping on an output from the linear gamut mapper. Accordingly, it is possible to continuously perform gamut mapping and tone mapping in a linear domain, thereby improving color accuracy.

The signal processing unit may further include an image analyzer configured to analyze the input image, and a section to perform the non-linear tone mapping is changed based on a content type or a resolution of the analyzed image. Accordingly, it is possible to change a dynamic range of an input image adaptively according to the content type or the resolution of the analyzed image.

The first level may vary an input setting signal. Accordingly, it is possibly to change a dynamic range of an input image adaptively according to a setting signal.

A level of output luminance after the non-linear tone mapping increases as the first level increases.

Accordingly, it is possible to change a dynamic range of an input image adaptively.

A section to perform the non-linear tone mapping may increase as the first level increases. Accordingly, it is possible to change a dynamic range of an input image adaptively.

The linear tone mapper may be configured to perform linear tone mapping on luminance equal to or higher a first level, and the non-linear tone mapper may be configured to perform non-linear tone mapping on luminance equal to or lower than a second level being lower than the first level. Accordingly, it is possible to map a dynamic range of an input image suitably for the display. In particular, it is possible to reduce an amount of calculation for tone mapping while improving low gray level expression.

The combiner may be configured to change luminance between the first level and the second level based on the non-linear tone mapping and the non-linear tone mapping. Accordingly, it is possible to map a dynamic range of an input image suitably for the display.

A signal processing device and an image display apparatus including the same according to another embodiment are provided, and the signal processing device includes: a display; and a signal processing unit configured to display a first object capable of controlling linear tone mapping and non-linear tone mapping, perform the linear tone mapping and the non-linear tone mapping on an input image according to a value set based on the object, and perform control to display a combined image on the display. Accordingly, it is possible to map a dynamic range of an input image suitably for the display. In particular, it is possible to reduce an amount of calculation for tone mapping while improving low gray level expression.

The signal processing unit may be configured to: display a second object for turning on or off a mode of mixing of the linear tone mapping and the non-linear tone mapping; and, when the second object is selected, perform the linear tone mapping and the non-linear tone mapping on the input image according to a setting of the first object capable of controlling the linear tone mapping and the non-linear tone mapping, and perform control to display a combined image on the display. Accordingly, it is possible to map a dynamic range of an input image suitably for the display. In particular, it is possible to reduce an amount of calculation for tone mapping while improving low gray level expression.

The signal processing unit may be configured to increase a section to perform the non-linear tone mapping as a selection bar in the object is positioned closer to a non-linear tone mapping item than a linear tone mapping item. Accordingly, it is possible to change a dynamic range of an input image adaptively according to a setting input.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Hereinafter, the present invention will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
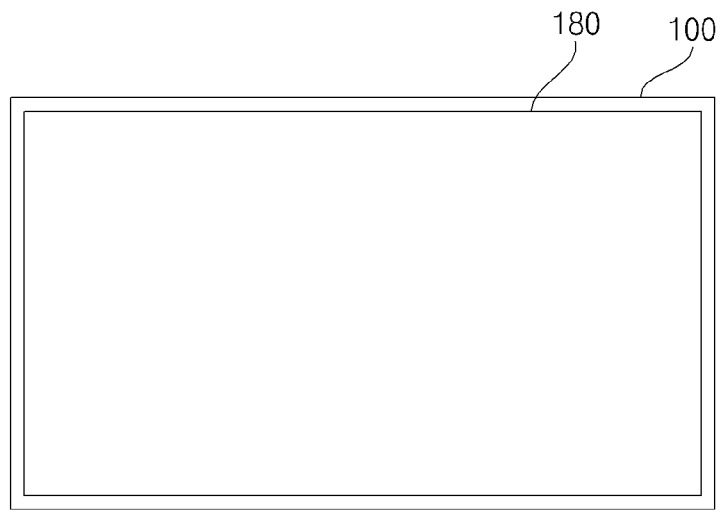
FIG. 1 is a diagram showing an image display system according to an embodiment of the present invention.

FIG. 1 is a diagram showing an image display system according to an embodiment of the present invention.

Referring to the drawing, an image display system 10 according to an embodiment of the present invention may include an image display apparatus 100.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present invention, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processing unit 170 (see FIG. 2) of the image display apparatus 100 performs image quality processing for the OLED panel.

Meanwhile, the image display apparatus 100 in FIG. 1 may be a TV, a monitor, a tablet PC, a mobile terminal, a display for a vehicle, etc.

Figure 2:
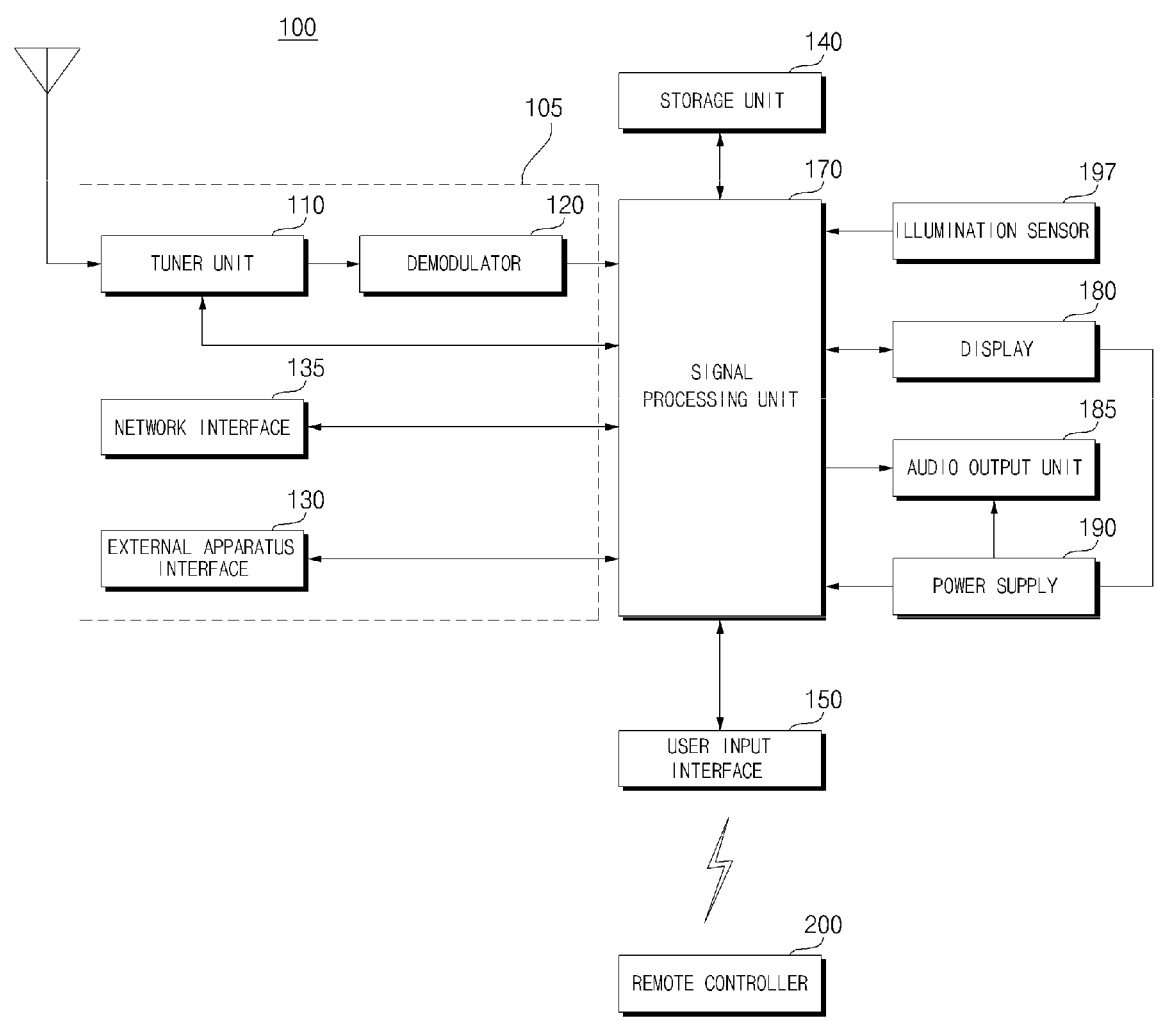
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present invention includes an image receiving unit 105, an external apparatus interface 130, a storage unit 140, a user input interface 150, a sensor unit (not shown), a signal processing unit 170, a display 180, and an audio output unit 185.

The image receiving unit 105 may include a tuner unit 110, a demodulator 120, a network interface 135, and an external apparatus interface 130.

Meanwhile, unlike the drawing, the image receiving unit 105 may include only the tuner unit 110, the demodulator 120, and the external apparatus interface 130. That is, the network interface 135 may not be included.

The tuner unit 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner unit 110 can process a digital broadcast signal or an analog broadcast signal. The analog baseband image or audio signal (CVBS/SIF) output from the tuner unit 110 may be directly input to the signal processing unit 170.

Meanwhile, the tuner unit 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner unit 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the signal processing unit 170. The signal processing unit 170 performs demultiplexing, image/audio signal processing, and the like, and then outputs an image to the display 180 and outputs audio to the audio output unit 185.

The external apparatus interface 130 may transmit or receive data with a connected external apparatus (not shown), e.g., a set-top box 50. To this end, the external apparatus interface 130 may include an A/V input and output unit (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output unit may receive image and audio signals from an external apparatus. Meanwhile, a wireless communication unit (not shown) may perform short-range wireless communication with other electronic apparatus.

Through the wireless communication unit (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communication unit (not shown).

The storage unit 140 may store a program for each signal processing and control in the signal processing unit 170, and may store signal-processed image, audio, or data signal.

In addition, the storage unit 140 may serve to temporarily store image, audio, or data signal input to the external apparatus interface 130. In addition, the storage unit 140 may store information on a certain broadcast channel through a channel memory function such as a channel map.

Although FIG. 2 illustrates that the storage unit is provided separately from the signal processing unit 170, the scope of the present invention is not limited thereto. The storage unit 140 may be included in the signal processing unit 170.

The user input interface 150 transmits a signal input by the user to the signal processing unit 170 or transmits a signal from the signal processing unit 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing unit 170, may transfer a user input signal input from a sensor unit (not shown) that senses a user's gesture to the signal processing unit 170, or may transmit a signal from the signal processing unit 170 to the sensor unit (not shown).

The signal processing unit 170 may demultiplex the input stream through the tuner unit 110, the demodulator 120, the network interface 135, or the external apparatus interface 130, or process the demultiplexed signals to generate and output a signal for image or audio output.

For example, the signal processing unit 170 receives a broadcast signal received by the image receiving unit 105 or an HDMI signal, and perform signal processing based on the received broadcast signal or the HDMI signal to thereby output a processed image signal.

The image signal processed by the signal processing unit 170 is input to the display 180, and may be displayed as an image corresponding to the image signal. In addition, the image signal processed by the signal processing unit 170 may be input to the external output apparatus through the external apparatus interface 130.

The audio signal processed by the signal processing unit 170 may be output to the audio output unit 185 as an audio signal. In addition, audio signal processed by the signal processing unit 170 may be input to the external output apparatus through the external apparatus interface 130.

Although not shown in FIG. 2, the signal processing unit 170 may include a demultiplexer, an image processor, and the like. That is, the signal processing unit 170 may perform a variety of signal processing and thus it may be implemented in the form of a system on chip (SOC). This will be described later with reference to FIG. 3.

In addition, the signal processing unit 170 can control the overall operation of the image display apparatus 100. For example, the signal processing unit 170 may control the tuner unit 110 to control the tuning of the RF broadcast corresponding to the channel selected by the user or the previously stored channel.

In addition, the signal processing unit 170 may control the image display apparatus 100 according to a user command input through the user input interface 150 or an internal program.

Meanwhile, the signal processing unit 170 may control the display 180 to display an image. At this time, the image displayed on the display 180 may be a still image or a moving image, and may be a 2D image or a 3D image.

Meanwhile, the signal processing unit 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing unit 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processing unit 170, an image signal, a data signal, a control signal, and the like received from the external apparatus interface 130.

Meanwhile, the display 180 may be configured as a touch screen and used as an input device in addition to an output device.

The audio output unit 185 receives a signal processed by the signal processing unit 170 and outputs it as an audio.

The photographing unit (not shown) photographs a user. The photographing unit (not shown) may be implemented by a single camera, but the present invention is not limited thereto and may be implemented by a plurality of cameras. Image information photographed by the photographing unit (not shown) may be input to the signal processing unit 170.

The signal processing unit 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output unit 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
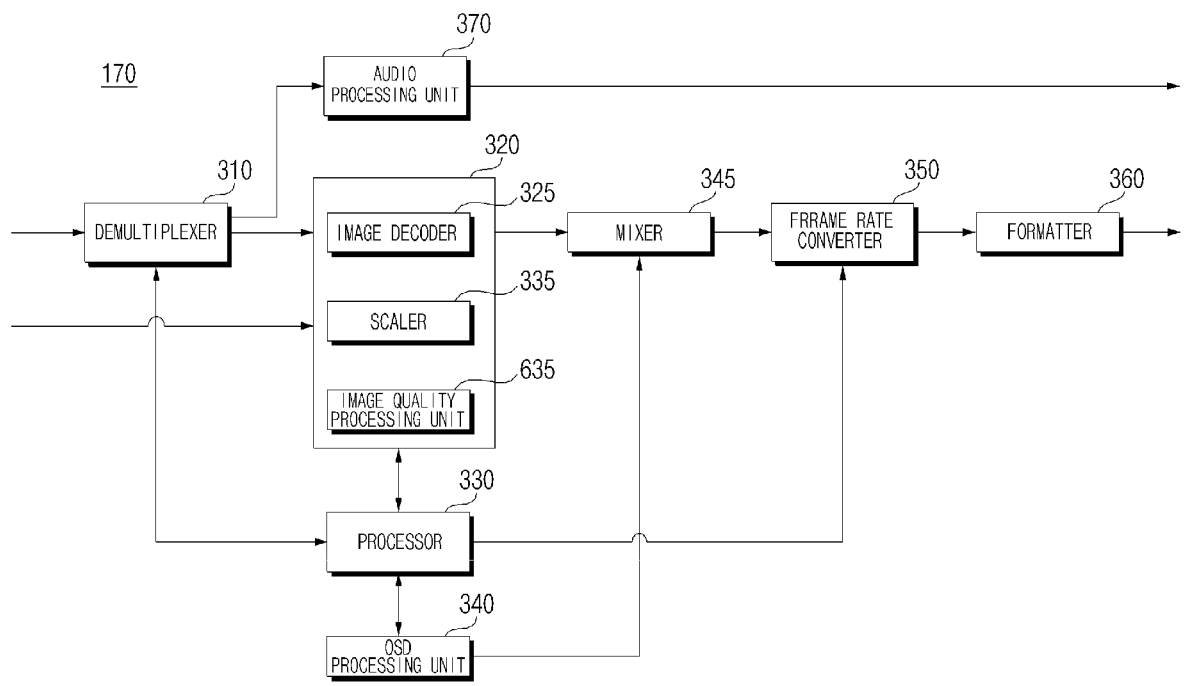
FIG. 3 is an example of an internal block diagram of the signal processing unit in FIG. 2.

FIG. 3 is an example of an internal block diagram of the signal processing unit in FIG. 2.

Referring to the drawing, the signal processing unit 170 according to an embodiment of the present invention may include a demultiplexer 310, an image processing unit 320, a processor 330, and an audio processing unit 370. In addition, the signal processing unit 170 may further include and a data processing unit (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner unit 110, the demodulator 120, or the external apparatus interface 130.

The image processing unit 320 may perform signal processing on an input image. For example, the image processing unit 320 may perform image processing on an image signal demultiplexed by the demultiplexer 310.

To this end, the image processing unit 320 may include an image decoder 325, a scaler 335, an image quality processing unit 635, an image encoder (not shown), an OSD processing unit 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processing unit 635 may perform image quality processing on an input image signal decoded by the image decoder 325 or the like.

For example, the image quality processing unit 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processing unit 340 generates an OSD signal according to a user input or by itself. For example, based on a user input signal, the OSD processing unit 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processing unit 340 may generate a pointer that can be displayed on the display, based on a pointing signal input from the remote controller 200. In particular, such a pointer may be generated by a pointing signal processing unit, and the OSD processing unit 340 may include such a pointing signal processing unit (not shown). Obviously, the pointing signal processing unit (not shown) may be provided separately from the OSD processing unit 340.

The mixer 345 may mix an OSD signal generated by the OSD processing unit 340 with a decoded image signal image-processed by the image processing unit 320. The mixed image signal is supplied to the frame rate converter 350.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processing unit 170.

For example, the processor 330 may control the tuner unit 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface unit 135 or to the external apparatus interface 130.

In addition, the processor 330 may control the demultiplexer 310, the image processing unit 320, and the like in the signal processing unit 170.

Meanwhile, the audio processing unit 370 in the signal processing unit 170 may perform the audio processing of the demultiplexed audio signal. To this end, the audio processing unit 370 may include various decoders.

In addition, the audio processing unit 370 in the signal processing unit 170 may process a base, a treble, a volume control, and the like.

The data processing unit (not shown) in the signal processing unit 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processing unit 170 shown in FIG. 3 is a block diagram for an embodiment of the present invention. Each component of the block diagram may be integrated, added, or omitted according to a specification of the signal processing unit 170 actually implemented.

In particular, the frame rate converter 350 and the formatter 360 may be provided separately in addition to the image processing unit 320.

Figure 4A:
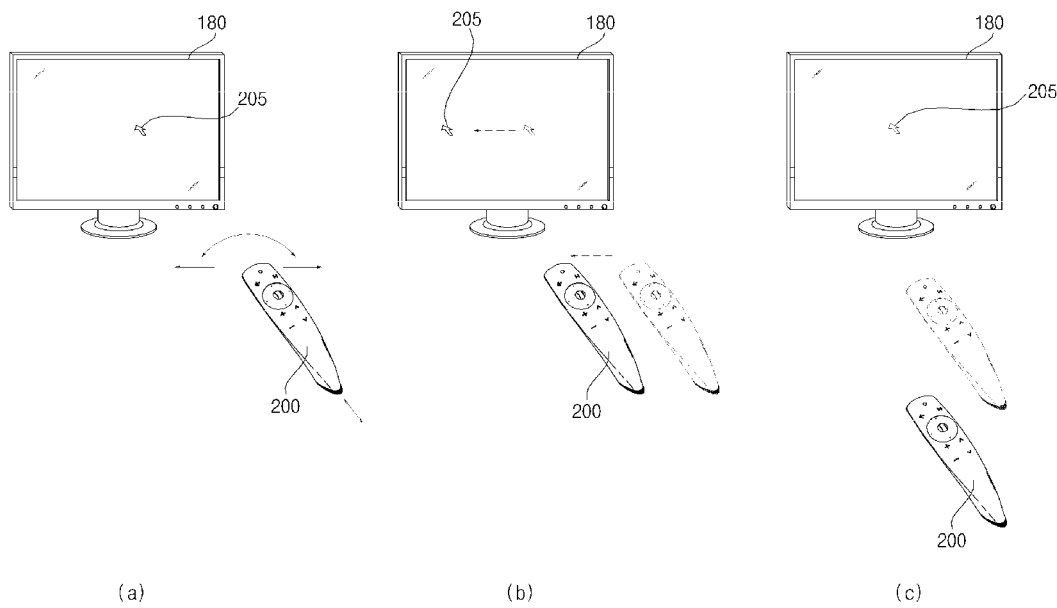
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
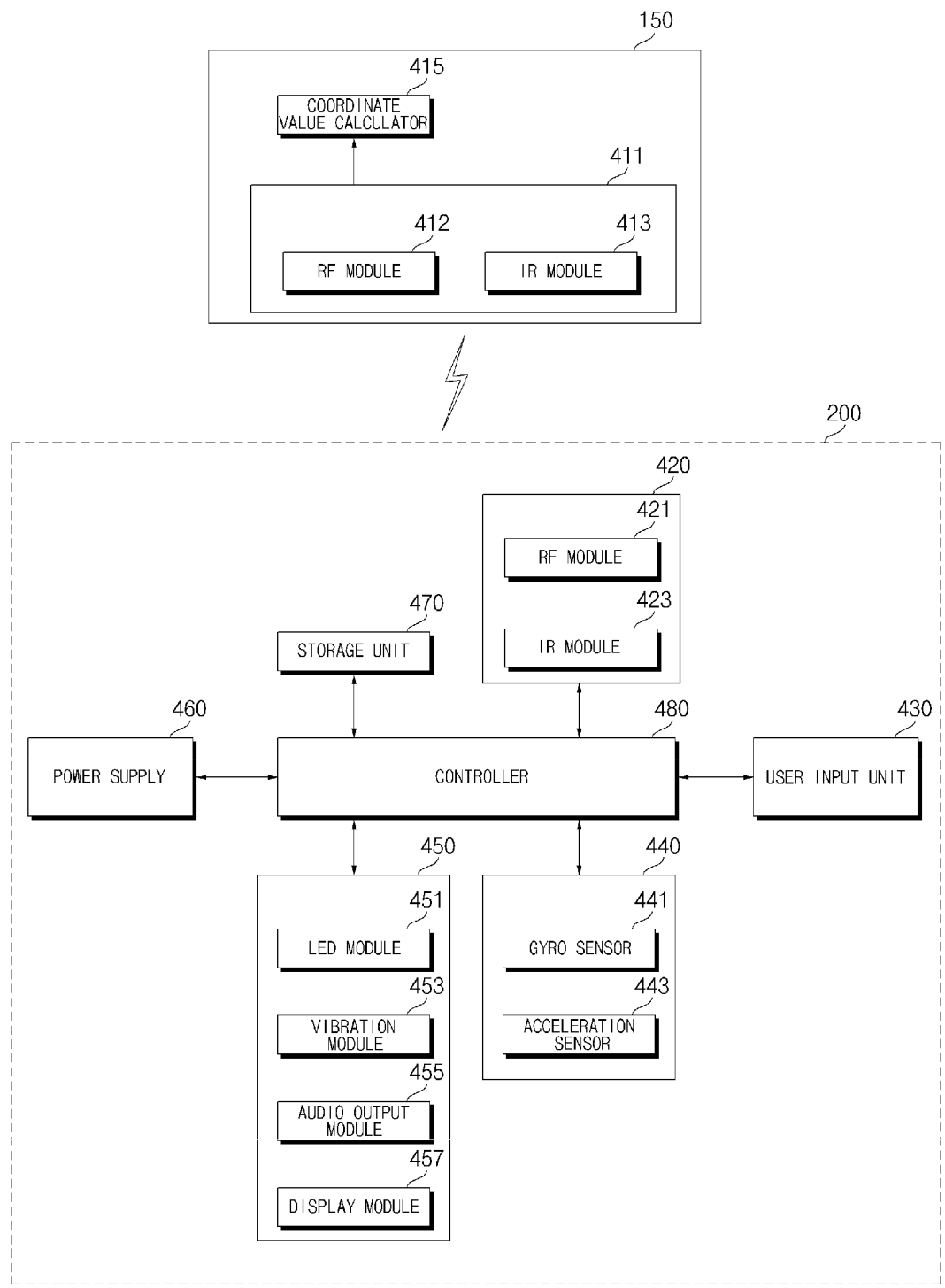
FIG. 4B is an internal block diagram of the remote controller of FIG. 2.

FIG. 4B is an internal block diagram of the remote controller of FIG. 2.

Referring to the drawing, the remote controller 200 includes a wireless communication unit 425, a user input unit 435, a sensor unit 440, an output unit 450, a power supply 460, a storage unit 470, and a controller 480.

The wireless communication unit 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user can input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means such as a scroll key, a jog key, etc., which can be operated by the user, and the present invention does not limit the scope of the present invention.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communication unit 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The storage unit 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the storage unit 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communication unit 425.

The user input interface 150 of the image display apparatus 100 includes a wireless communication unit 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communication unit 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processing unit 170, not in the user input interface 150.

Figure 5:
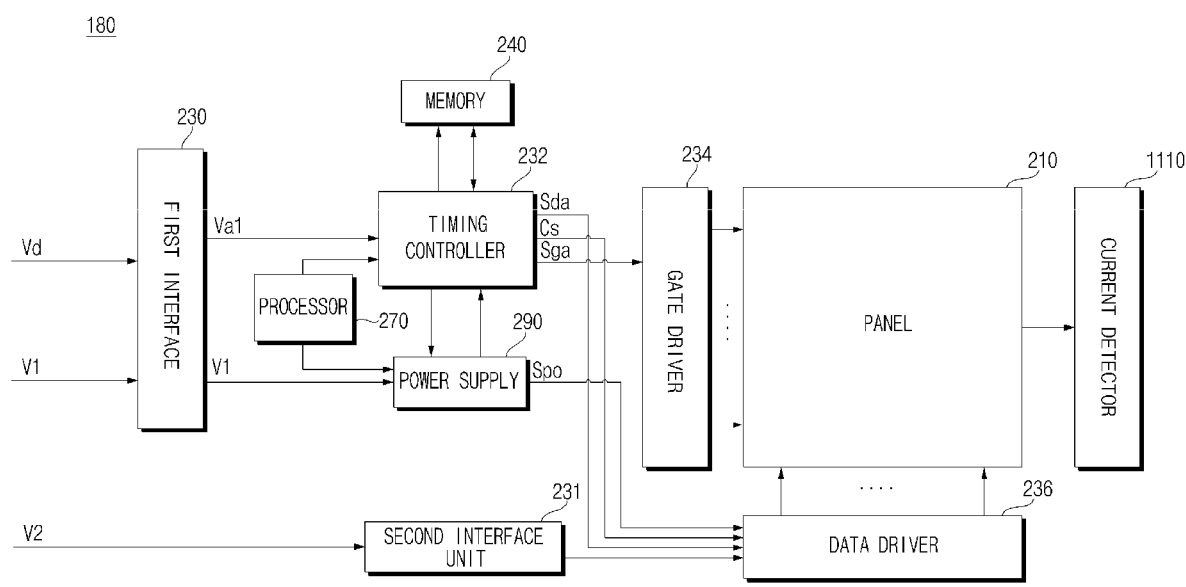
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processing unit 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processing unit 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
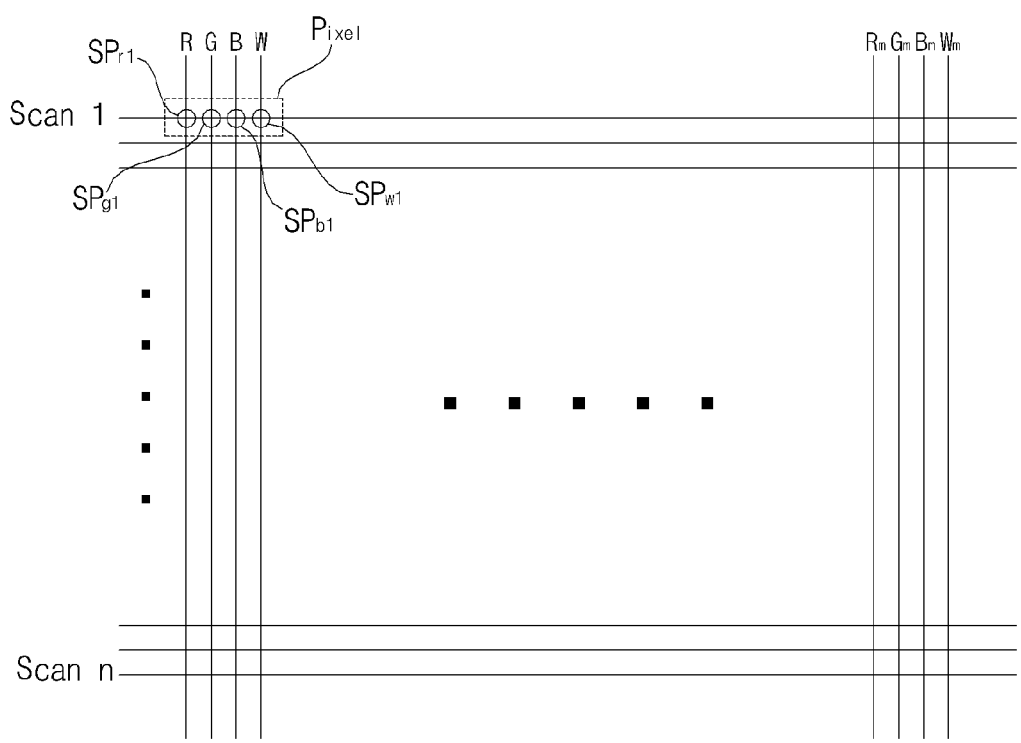
FIG. 6A and FIG. 6B are diagrams referred to in the description of an organic light emitting diode panel of FIG. 5.
Figure 6B:
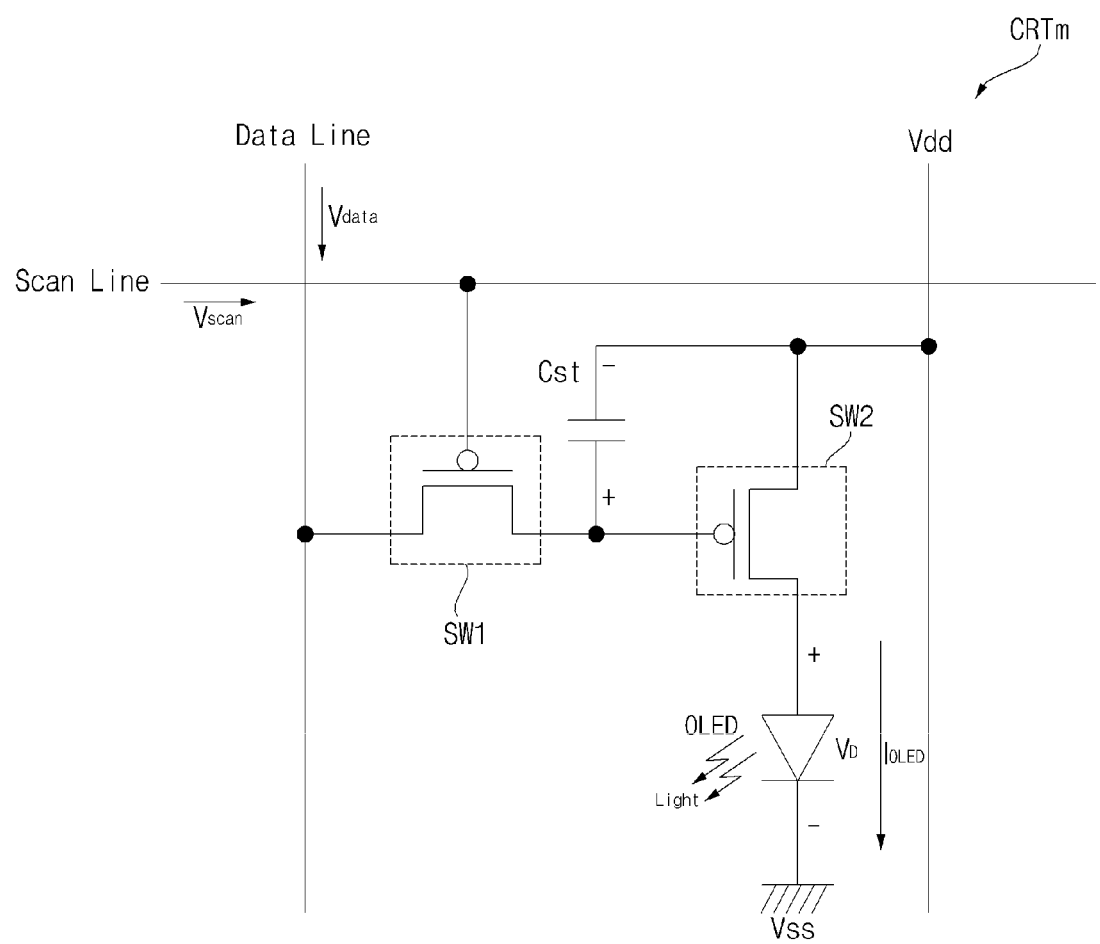

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pluse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED).

Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with development of camera and broadcasting technologies, resolution and vertical synchronization frequencies for input images have improved as well. In particular, there are increasing need of image quality processing on an image signal having 4K resolution and 120 Hz vertical synchronization frequency. Accordingly, a method of improving image quality processing of an input image signal is proposed. A detailed description thereof is hereinafter provided with reference to FIG. 7 and other drawings.

Figure 7:
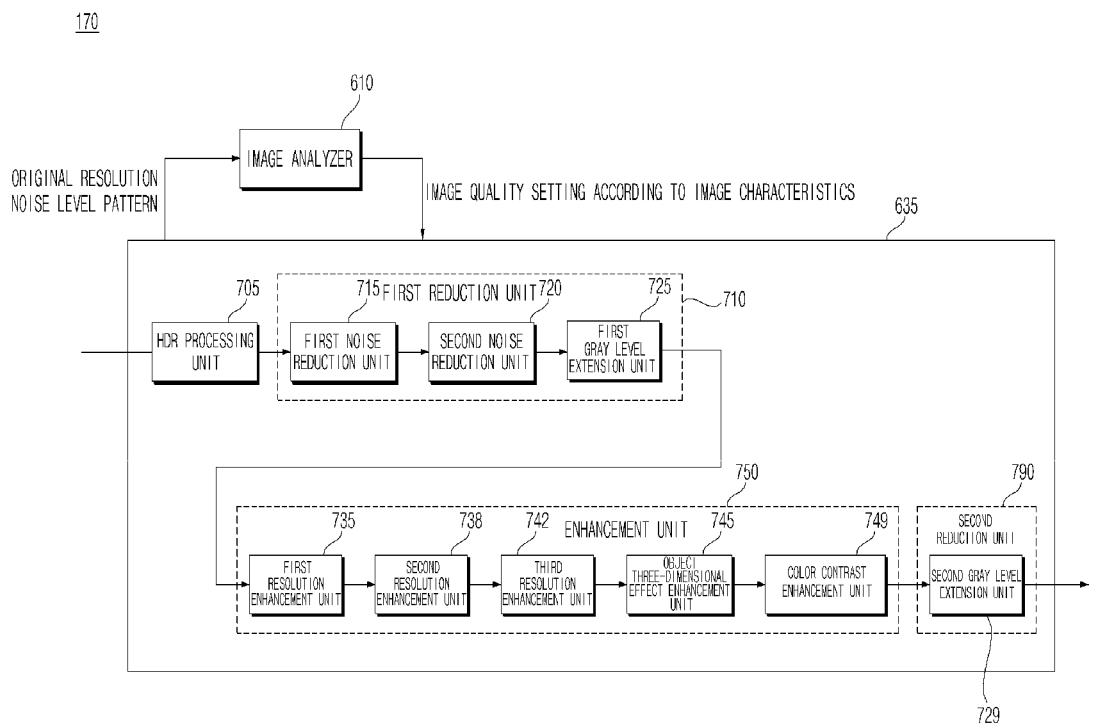
FIG. 7 is an example of an internal block diagram of a signal processing device according to an embodiment of the present invention.

FIG. 7 is an example of an internal block diagram of a signal processing device according to an embodiment of the present invention.

Meanwhile, a signal processing device 170 in FIG. 7 may correspond to the signal processing unit 170 in FIG. 2.

First, referring to FIG. 7, the signal processing device 170 according to an embodiment of the present invention may include an image analyzer 610 and an image quality processing unit 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiving unit 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processing unit 635.

The image quality processing unit 635 may include an HDR processing unit 705, a first reduction unit 710, an enhancement unit 750, and a second reduction unit 790.

The HDR processing unit 705 may receive an image signal and perform high dynamic range (HDR) processing on the input image signal.

For example, the HDR processing unit 705 may convert a standard dynamic range (SDR) image signal into an HDR image signal.

For another example, the HDR processing unit 705 may receive an image signal, and perform gray level processing on the input image signal for an HDR.

Meanwhile, if an input image signal is an SDR image signal, the HDR processing unit 705 may bypass gray level conversion, and, if an input image signal is an HDR image signal, the HDR processing unit 705 perform gray level conversion. Accordingly, it is possible to improve high gray level expression for an input image.

Meanwhile, the HDR processing unit 705 may perform gray level conversion processing based on a first gray level conversion mode, in which low gray level is to be enhanced and high gray level is to be saturated, and a second gray level conversion mode, in which low gray level and high gray level are somewhat uniformly converted.

The HDR processing unit 705 may perform gray level conversion processing based on a first gray level conversion curve or a second gray level conversion curve.

For example, the HDR processing unit 705 may perform gray level conversion processing based on data in a lookup table corresponding to the first gray level conversion curve or based on data in a lookup table corresponding to the second gray level conversion curve.

Specifically, if the first gray level conversion mode is implemented, the HDR processing unit 705 may perform gray level conversion processing based on data corresponding to the first gray level conversion mode in a lookup table.

More specifically, if the first gray level conversion mode is implemented, the HDR processing unit 705 may perform gray level conversion processing based on an equation of input data and the first gray level conversion mode in a lookup table determined by the equation. Here, the input data may include video data and metadata.

Meanwhile, if the second gray level conversion mode is implemented, the HDR processing unit 705 may perform gray level conversion processing based on data corresponding to the second gray level conversion mode in a lookup table.

More specifically, if the second gray level conversion mode is implemented, the HDR processing unit 705 may perform gray level conversion processing based on an equation of input data and data corresponding to the second gray level conversion mode in a lookup table determined by the equation. Here, the input data may include video data and metadata.

Meanwhile, the HDR processing unit 705 may select the first gray level conversion mode or the second gray level conversion mode according to a third gray level conversion mode or a fourth gray level conversion mode in a high gray level amplifying unit 851 in the second reduction unit 790.

For example, if the third gray level conversion mode is implemented, the high gray level amplifying unit 851 in the second reduction unit 790 may perform gray level conversion processing based on data corresponding to the third gray level conversion mode in a lookup table.

Specifically, if the third gray level conversion mode is implemented, the high gray level amplifying unit 851 in the second reduction unit 790 may perform gray level conversion processing based on an equation of input data and data corresponding to the third gray level conversion mode in a lookup table determined by the equation. Here, the input data may include video data and metadata.

Meanwhile, if the fourth type gray level conversion is implemented, the high gray level amplifying unit 851 in the second reduction unit 790 may perform gray level conversion processing based on data corresponding to the fourth gray level conversion mode in a lookup table.

Specifically, if the fourth gray level conversion mode is implemented, the high gray level amplifying unit 851 in the second reduction unit 790 may perform gray level conversion processing based on an equation of input data and data corresponding to the fourth gray level conversion mode in a lookup table determined by the equation. Here, the input data may include video data and metadata.

For example, if the fourth gray level conversion mode is implemented in the high gray level amplifying unit 851 in the second reduction unit 790, the HDR processing unit 705 may implement the second gray level conversion mode.

For another example, if the third gray level conversion mode is implemented in the high gray level amplifying unit 851 in the second reduction unit 790, the HDR processing unit 705 may implement the first gray level conversion mode.

Alternatively, the high gray level amplifying unit 851 in the second reduction unit 790 may change a gray level conversion mode according to a gray level conversion mode in the HDR processing unit 705.

For example, if the second gray level conversion mode is implemented in the HDR processing unit 705, the high gray level amplifying unit 851 in the second reduction unit 790 may perform the fourth gray level conversion mode.

For another example, if the first gray level conversion mode is implemented in the HDR processing unit 705, the high gray level amplifying unit 851 in the second reduction unit 790 may implement the third gray level conversion mode.

Meanwhile, the HDR processing unit 705 according to an embodiment of the present invention may implement a gray level conversion mode so that low gray level and high gray level are converted uniformly.

That is, the HDR processing unit 705 may perform gray level conversion processing based on the second gray level conversion curve, not the first gray level conversion curve.

Meanwhile, according to the second gray level conversion mode in the HDR processing unit 705, the second reduction unit 790 may implement the fourth gray level conversion mode and thereby amplify an upper limit on gray level of a received input signal. Accordingly, it is possible to map the dynamic range of an input image suitably for a display.

Next, the first reduction unit 710 may perform noise reduction on an input image signal or an image signal processed by the HDR processing unit 705.

Specifically, the first reduction unit 710 may perform multiple stages of noise reduction processing and a first stage of gray level extension processing on an input image signal or an HDR image from the HDR processing unit 705.

To this end, the first reduction unit 710 may include a plurality of noise reduction parts 715 and 720 for reducing noise in multiple stages, and a first gray level extension unit 725 for extending gray level.

Next, the enhancement unit 750 may perform multiple stages of image resolution enhancement processing on an image from the first reduction unit 710.

In addition, the enhancement unit 750 may perform object three-dimensional effect enhancement processing. In addition, the enhancement unit 750 may perform color or contrast enhancement processing.

To this end, the enhancement unit 750 may include: a plurality of resolution enhancement units 735, 738, 742 for enhancing a resolution of an image in multiple stages; an object three-dimensional effect enhancement unit 745 for enhancing a three-dimensional effect of an object; and a color contrast enhancement unit 749 for enhancing color or contrast.

Next, the second reduction unit 790 may perform a second stage of gray level extension processing based on a noise-reduced image signal received from the first reduction unit 710.

Meanwhile, the second reduction unit 790 may amplify an upper limit on gray level of an input signal, and extend a resolution of high gray level of the input signal. Accordingly, it is possible to map the dynamic range of an input image suitably for a display.

For example, gray level extension may be performed uniformly on the entire gray level range of an input signal. Accordingly, gray level extension is performed uniformly on the entire area of an input image, thereby improving high gray level expression.

Meanwhile, the second reduction unit 790 may perform gray level amplification and extension based on a signal received from the first gray level extension unit 725. Accordingly, it is possible to map the dynamic range of an input image suitably for a display.

Meanwhile, if an input image signal input is an SDR image signal, the second reduction unit 790 may vary the degree of amplification based on a user input signal. Accordingly, it is possible to improve high gray level expression in response to a user setting.

Meanwhile, if an input image signal is an HDR image signal, the second reduction unit 790 may perform amplification according to a set value. Accordingly, it is possible to map the dynamic range of an input image suitably for a display.

Meanwhile, if an input image signal is an HDR image signal, the second reduction unit 790 may vary the degree of amplification based on a user input signal. Accordingly, it is possible to improve high gray level expression according to a user setting.

Meanwhile, in the case of extending gray level based on a user input signal, the second reduction unit 790 may vary the degree of extension of gray level. Accordingly, it is possible to improve high gray level expression according to a user's setting.

Meanwhile, the second reduction unit 790 may amplify an upper limit on gray level according to a gray level conversion mode in the HDR processing unit 705. Accordingly, it is possible to map the dynamic range of an input image suitably for a display.

The signal processing device 170 includes the HDR processing unit 705 configured to receive an image signal and adjust luminance of the input image signal, and the reduction unit 790 configured to amplify brightness of the image signal received from the HDR processing unit 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reduction unit 790 may include the high gray level amplifying unit 851 configured to amplify an upper limit on gray level of an input signal, and a decontouring unit 842 and 844 configured to extend the resolution of gray level amplified by the high gray level amplifying unit 851.

The second reduction unit 790 may include a second gray level extension unit 729 for a second stage of gray level extension.

Meanwhile, the image quality processing unit 635 in the signal processing device 170 according to the present invention is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reduction unit 710, and the two stages of gray level extension processing may be performed by the first gray level extension unit 725 in the first reduction unit 710 and the second gray level extension unit 729 in the second reduction unit 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancement units 735, 738, and 742, and the object three-dimensional effect enhancement may be performed by the object three-dimensional enhancement unit 745.

Meanwhile, the first characteristic of the signal processing device 170 of the present invention lies in applying the same algorithm or similar algorithms to image quality processing multiple times, thereby gradually enhancing an image quality.

To this end, the image quality processing unit 635 of the signal processing device 170 of the present invention may perform image quality processing by applying the same algorithm or similar algorithms two or more times.

Meanwhile, the same algorithm or the similar algorithms implemented by the image quality processing unit 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, another characteristic of the signal processing device 170 of the present invention lies in performing noise reduction processing in multiple stages. Each stage of noise reduction processing may include temporal processing and spatial processing.

Meanwhile, the high dynamic range (HDR) technique utilizes a much greater range of luminosity (nit) than is possible a standard dynamic range (SDR) or any other existing technique, and accordingly a much wide range of contrast may be expressed.

Recently, it is possible to generate a high dynamic range image using a high-specification camera having a wide dynamic range.

Meanwhile, a SDR image is in a ordinary dynamic range, and may express approximately 100 nit or less according to a broadcasting standard.

However, the high dynamic range technique, which has been widely used in recent years, enables expressing a wider range up to approximately 10,000 nit.

Accordingly, when the high dynamic range technique is employed, image characteristics changes greatly compared to the existing ordinary dynamic range, and thus, it is required to change overall system such as an image format, a related metadata, a compression scheme, an interface between devices, the display 180, etc. in order to express the change in the image characteristics.

The present invention relates to a method for performing tone mapping to maintain a quality of a source image intact when an existing ordinary dynamic range image or a high dynamic range image is reproduced in a display apparatus which has been developed with a wider dynamic range.

In particular, since there are many cases where the dynamic range of an image is different from the dynamic range of the display 180, it is necessary to map the dynamic range of the image suitably for the display 180.

Meanwhile, it is necessary to express luminance (brightness) of a reproducible range intact and perform image quality processing on a brightness component of a non-reproducible range so as to minimize damage to image quality compared to a source image. In addition, a transformation function by which a user's desired intention is reflected is required as well.

Figure 8A:
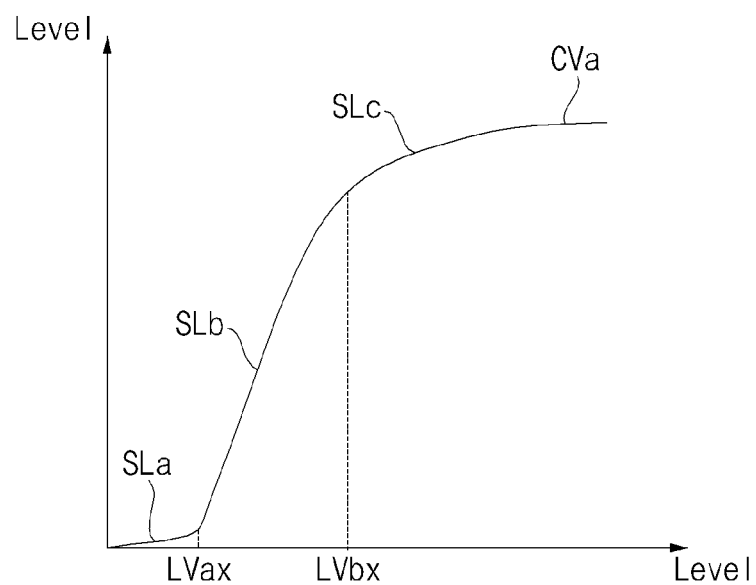
FIGS. 8A to 8C are diagrams referred to in the description of a signal processing device related to the present invention.
Figure 8B:
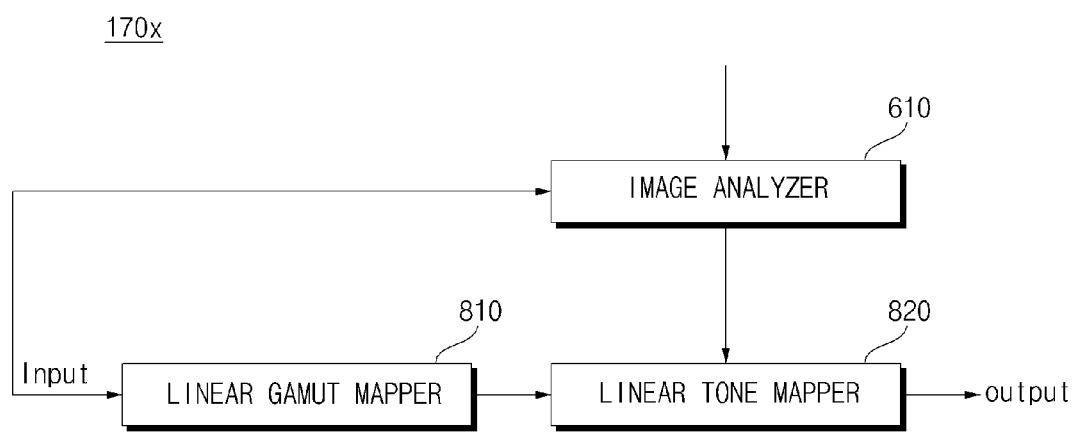
Figure 8C:
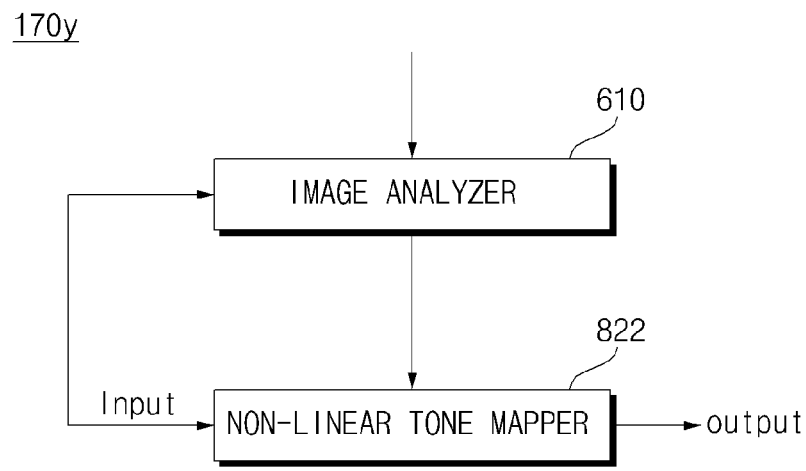

FIGS. 8A to 8C are diagrams referred to in the description of a signal processing device related to the present invention.

First, FIG. 8A is a diagram showing a linear tone mapping curve CVa.

Referring to the drawing, linear tone mapping or gray level conversion may be performed in multiple sections, individually, according to the linear tone mapping curve CVa.

For example, if an input luminance level is equal to or lower than LVax, luminance transformation may be performed based on a linear tone mapping curve with a first slope SLa; if an input luminance level is between LVax and LVbx, luminance transformation may be performed based on a linear tone mapping curve with a second slope SLb greater than the first slope SLa; and, if an input luminance level is higher than LVbx, luminance transformation may be performed based on a linear tone mapping curve with a third slope SLc smaller than the second slope SLb.

FIG. 8B shows an example of a signal processing unit for performing the linear tone mapping shown in FIG. 8A.

Referring to the drawing, a signal processing unit 170x may include an image analyzer 610, a linear gamut mapper 81, and a linear tone mapper 820.

The linear tone mapper 820 is capable of mapping input luminance directly into output luminance, and hence, tone mapping data may be generated intuitively and easily.

Meanwhile, as shown in the drawing, if the linear gamut mapping unit 810 first performs linear gamut mapping and then the linear tone mapper 820 performs linear tone mapping, it is possible to process gamut mapping and tone mapping continuously in the linear domain, thereby improving color accuracy.

However, if a sufficient signal gray level is not allocated when a luminance component is transformed to a linear domain, it may result in insufficient gray level expression. In particular, low gray level expression may be insufficient.

FIG. 8C shows an example of a signal processing unit for performing non-linear tone mapping.

Referring to the drawing, a signal processing unit 170y may include an image analyzer 610 and a non-linear tone mapper 822.

The non-linear tone mapper 822 performs tone mapping in a domain where luminance of an input image is non-linear. In the case of performing tone mapping, data from the image analyzer 610 may be used.

Meanwhile, non-linear tone mapping performed by the non-linear tone mapper 822 may make it possible to output of an input non-linear signal into a desired signal level and thus require small signal gray level and accordingly, hardware can be implemented more efficiently.

However, since it is difficult to intuitively generate tone mapping data compared to linear tone mapping, a more complicated calculating process is required. In addition, since it is hard to perform gamut matching before tone mapping, the degree of color accuracy in non-linear tone mapping may be lower than in linear tone mapping.

Considering the above, the present invention proposes a method for mapping the dynamic range of an input image suitably for a display. In particular, a method for reducing an amount of calculation for tone mapping while improving low gray level expression is proposed. A detailed description thereof will be provided with reference to FIG. 9 and other drawings.

Figure 9:
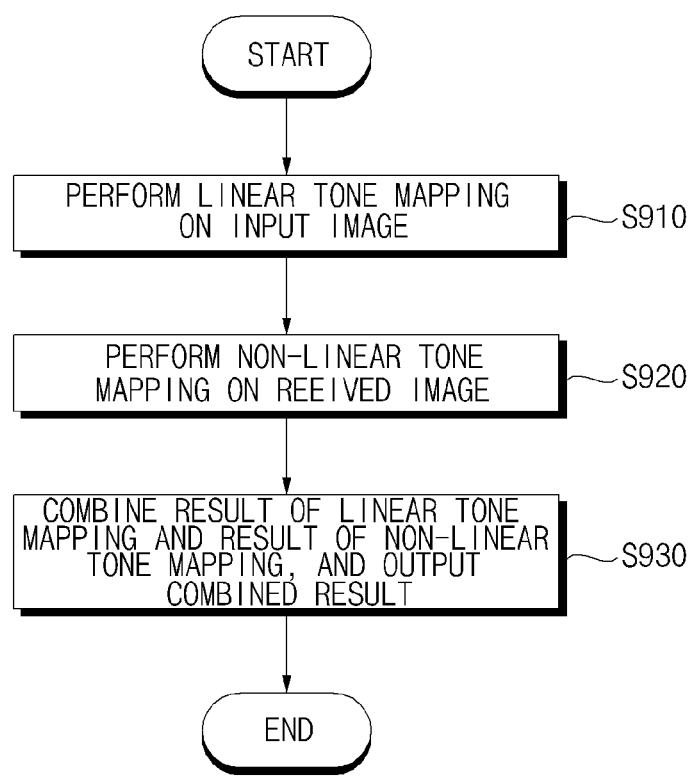
FIG. 9 is a flowchart showing a method of operating a signal processing device according to an embodiment of the present invention.

FIG. 9 is a flowchart showing a method of operating a signal processing device according to an embodiment of the present invention.

Referring to the drawing, a signal processing device 170 according to an embodiment of the present invention may perform linear tone mapping on a part of an input image (S910).

Figure 10:
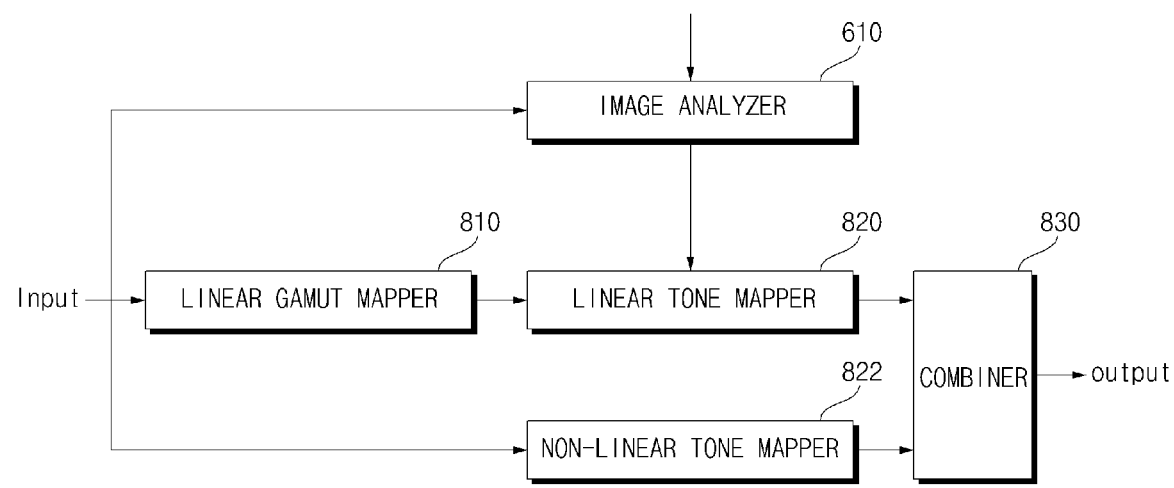
FIG. 10 is an example of an internal block diagram of a signal processing device according to an embodiment of the present invention.

For example, the linear tone mapper 820 in FIG. 10 may perform linear tone mapping on a part of an input image.

Next, the signal processing device 170 may perform non-linear tone mapping on another part of the input image (S920).

For example, the non-linear tone mapper 822 in FIG. 10 may perform non-linear tone mapping on the another part of the input image.

Next, the signal processing device 170 may combine an output from the linear tone mapper 820 and an output from the non-linear tone mapper 822 (S930).

For example, the combiner 830 in FIG. 10 may combine the output from the linear tone mapper 820 and the output from the non-linear tone mapper 822.

Accordingly, since tone mapping is performed in a linear domain, color accuracy may improve. In addition, since tone mapping is performed in a non-linear domain, low gray level expression may improve.

In particular, it is possible to achieve color accuracy improvement and low gray level expression at the same time, compared to the examples in FIGS. 8A to 8C.

FIG. 10 is an example of an internal block diagram of a signal processing device according to an embodiment of the present invention, and FIGS. 11 to 14B are diagrams referred to in the description of the signal processing device of FIG. 10.

First, referring to FIG. 10, the signal processing device 170 according to an embodiment of the present invention may include a linear tone mapper 820 configured to perform linear tone mapping on one part of an input image; a non-linear tone mapper 822 configured to perform non-linear tone mapper on another part of the input image; and a combiner 830 configured to combine an output from the linear tone mapper 820 and an output from the non-linear tone mapper 822.

Accordingly, it is possible to map the dynamic range of the input image suitably for the display 180. In particular, it is possible to reduce an amount of calculation for tone mapping, while increasing low gray level expression. Specifically, it is possible to achieve color accuracy improvement and low gray level expression at the same time.

Meanwhile, the signal processing device 170 according to an embodiment of the present invention may further include an image analyzer 610 and a linear gamut mapper 810 configured to perform linear gamut mapping on an input image.

The image analyzer 7610 may output information on the display 180, i.e., peak luminance information of the display 180.

Meanwhile, the image analyzer 610 may output metadata on an input image. The metadata may include tone mapping data, mastering display peak luminance information, etc.

Meanwhile, the image analyzer 610 may analyze an input image, and output image content type information or image resolution information of the analyzed image.

Figure 11:
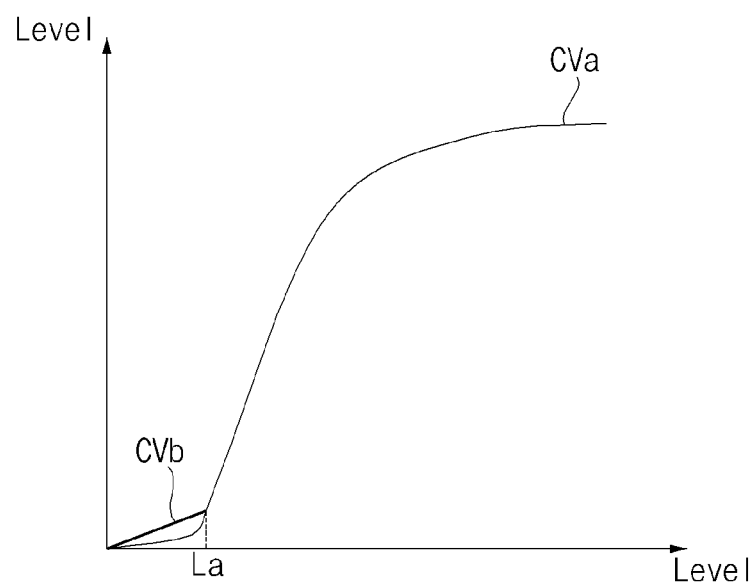
FIGS. 11 to 14B are diagrams referred to in the description of the signal processing device of FIG. 10.

FIG. 11 is a diagram referred to in the description about linear tone mapping and non-linear tone mapping.

Referring to the drawing, tone mapping may be performed according to a linear tone mapping curve CVa and non-linear tone mapping curve CVb.

The signal processing device 170 may perform linear tone mapping on luminance in an input image equal to or higher a first level La, according to the linear tone mapping curve CVa. The signal processing device 170 may perform non-linear tone mapping on at least some luminance in the input image lower than the first level La, according to the non-linear tone mapping curve CVb.

That is, the linear tone mapper 820 in the signal processing device 170 according to an embodiment of the present invention may perform linear tone mapping on luminance equal to or higher than the first level La, and the non-linear tone mapper 822 may perform non-linear tone mapping on at least some luminance lower than the first level La. Accordingly, it is possible to map the dynamic range of the input image suitably for the display 180.

In particular, in the case of transformation of luminance lower than the first level La, low gray level expression improves because the level of the non-linear tone mapping curve CVb is greater than the level of the linear tone mapping curve CVa.

Meanwhile, since linear tone mapping is performed on luminance equal to or higher than the first level La, color accuracy after the tone mapping may improve.

Meanwhile, the signal processing device 170 according to an embodiment of the present invention further comprises a linear gamut mapper 810 configured to perform linear gamut mapping on an input image. The linear tone mapper 820 may continuously perform linear tone mapping on outputs from the linear gamut mapper 810. Accordingly, gamut mapping and tone mapping are capable of being continuously performed in a linear domain and hence color accuracy may improve.

Meanwhile, the non-linear tone mapper 822 in the signal processing device 170 according to an embodiment of the present invention may vary a non-linear tone mapping section according to image content type information or image resolution information from the image analyzer 610. Accordingly, it is possible to adaptively vary the dynamic range of an input image.

For example, the non-linear tone mapper 811 may increases the non-linear tone mapping section as the image resolution increases.

For another example, the non-linear tone mapper 811 may increase the non-linear tone mapping section as the average luminance level (APL) decreases.

Meanwhile, the first level in FIG. 11, which is a discriminant of whether to perform linear tone mapping and non-linear tone mapping, may vary an input setting signal. Accordingly, it is possible to adaptively vary the dynamic range of an input image a setting signal.

For example, the level of output luminance after non-linear tone mapping increases as the first level increases. Accordingly, it is possible to adaptively vary the dynamic range of an input image.

For another example, the non-linear tone mapping section increases as the first level increases. Accordingly, it is possible to adaptively vary the dynamic range of an input image.

Figure 12:
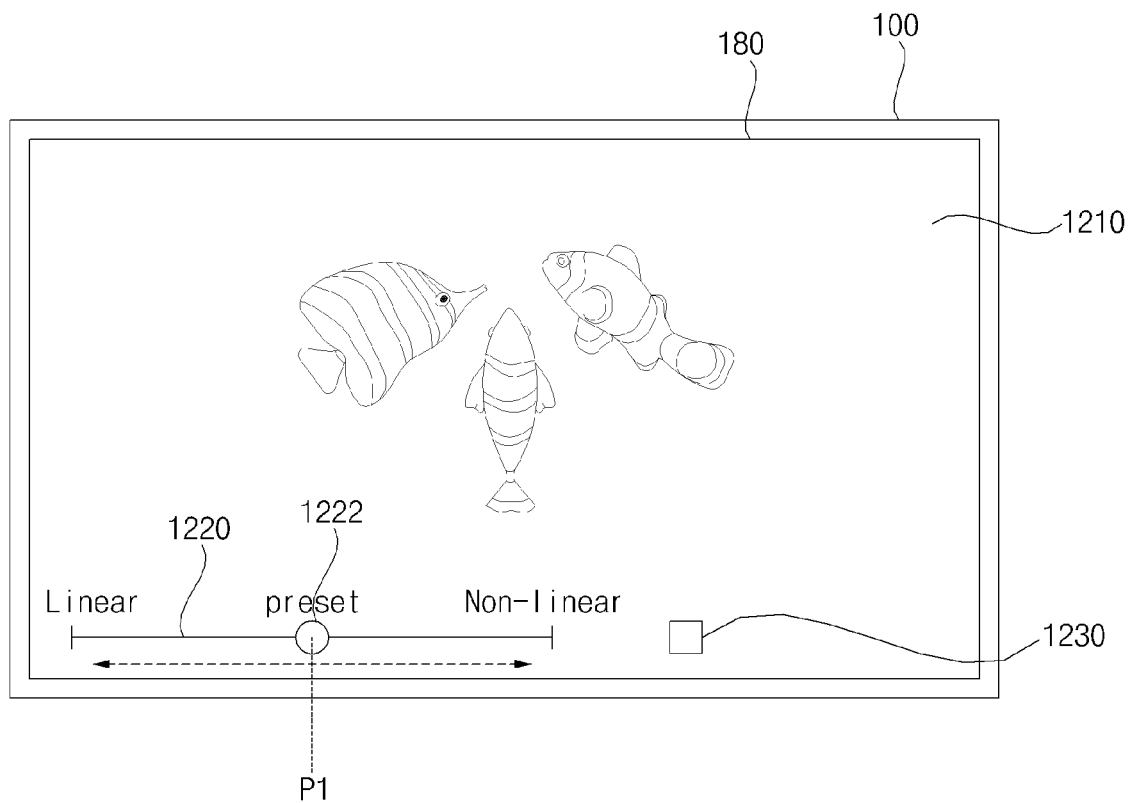

FIG. 12 shows an example in which a first object 1220 capable of controlling linear tone mapping and non-linear tone mapping, and a second object 1230 for turning on and off a mode of mixing of linear tone mapping and non-linear tone mapping are displayed on the display 180 of the image display apparatus 100.

For example, if a specific button is operated while a specific image 1210 is displayed, the signal processing unit 170 may perform control such that the first object 1220 capable of controlling linear tone mapping and non-linear tone mapping and the second object 1230 for turning on or off the mix mode of linear tone mapping and non-linear tone mapping are displayed, as shown in FIG. 12.

Meanwhile, while the second object 1230 is selected, the signal processing unit 170 may perform control such that linear tone mapping and non-linear tone mapping are performed on an input image according to setting of the first object 1220 capable of controlling linear tone mapping and non-linear tone mapping and then a combined image is displayed on the display 180.

Figure 13A:
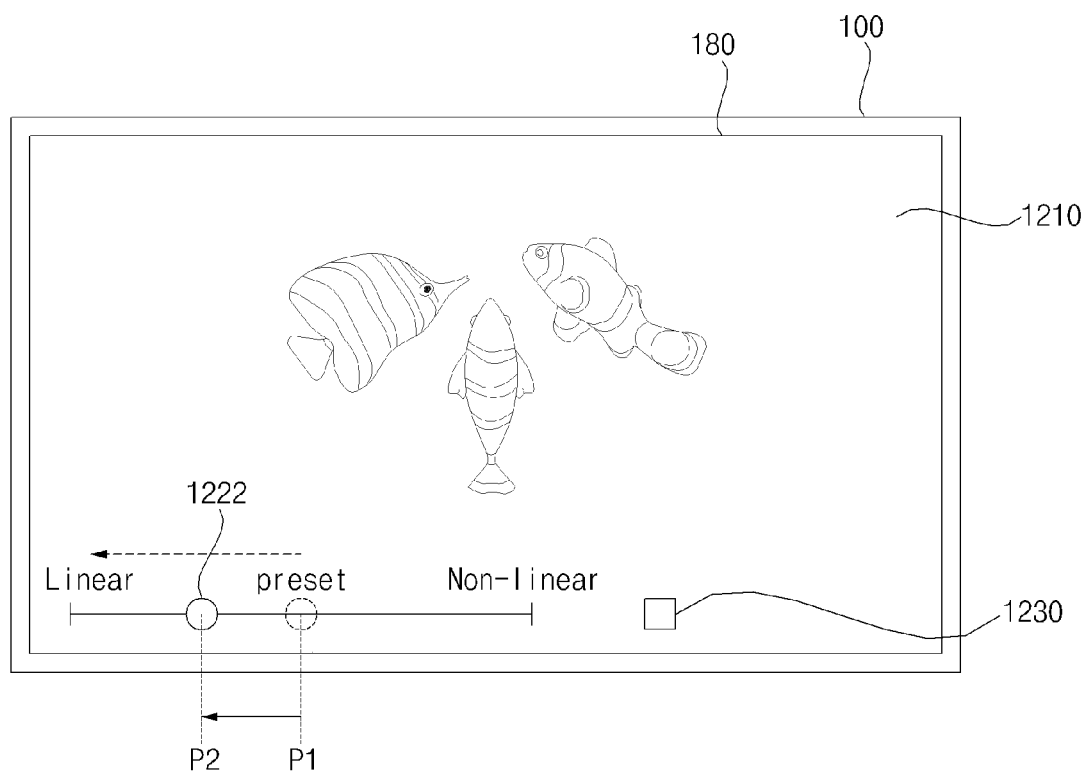
Figure 13B:
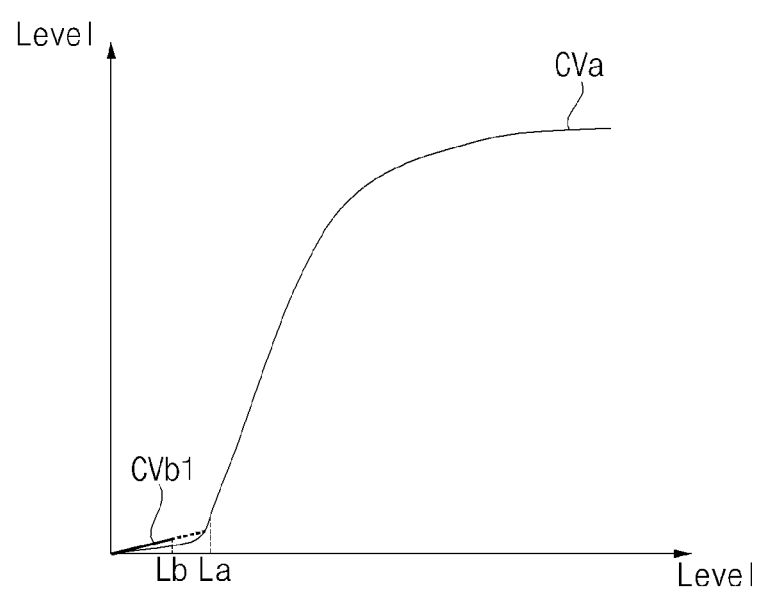

For example, it may be controlled such that the closer the selection bar 1222 in the first object 1220 is positioned closer to a linear tone mapping item than a non-linear tone mapping item, as shown in FIG. 13A, the smaller the non-linear tone mapping section becomes, as shown in FIG. 13B.

FIG. 13A shows an example in which the selection bar 1222 moves from a middle position P1 to a position P2 that is further closer to the linear tone mapping item.

Accordingly, a non-linear tone mapping section may become smaller, as shown in FIG. 13B.

FIG. 13B shows an example of a linear tone mapping curve CVa and a non-linear tone mapping curve CVb1. The linear tone mapping curve CVa in FIG. 13B may be to the same as the linear tone mapping curve CVa in FIG. 11, but the non-linear tone mapping curve CVb1 in FIG. 13B may have a small range and a lower level compared to the non-linear tone mapping curve CVb in FIG. 11.

In particular, non-linear tone mapping may be performed on luminance equal to or lower than a level Lb being lower than a first level La in FIG. 11, according to the non-linear tone mapping curve CVb1.

Meanwhile, the slope of the non-linear tone mapping curve CVb1 may be smaller than the slope of the non-linear tone mapping curve CVb in FIG. 11.

Accordingly, as the selection bar 1222 is positioned closer to the linear tone mapping item than the non-linear tone mapping item, the non-linear tone mapping section may decrease and hence a luminance transformation level after non-linear tone mapping may decrease.

Meanwhile, the linear tone mapper 820 may perform linear tone mapping on luminance equal to or higher than the first level La, and the non-linear tone mapper 822 may perform non-linear tone mapping on luminance equal to or lower than a second level Lb being lower than the first level La. Accordingly, it is possible to map the dynamic range of an input image suitably for the display 180. In particular, it is possible to reduce an amount of calculation for tone mapping, while improving low gray level expression.

Meanwhile, the combiner 830 may perform control such that luminance between the first level La and the second level Lb changes based on linear tone mapping and non-linear tone mapping. For example, it may be controlled such that luminance changes based on a value between the linear tone mapping and the non-linear tone mapping. Accordingly, it is possible to map the dynamic range of an input image suitably for the display 180.

Figure 14A:
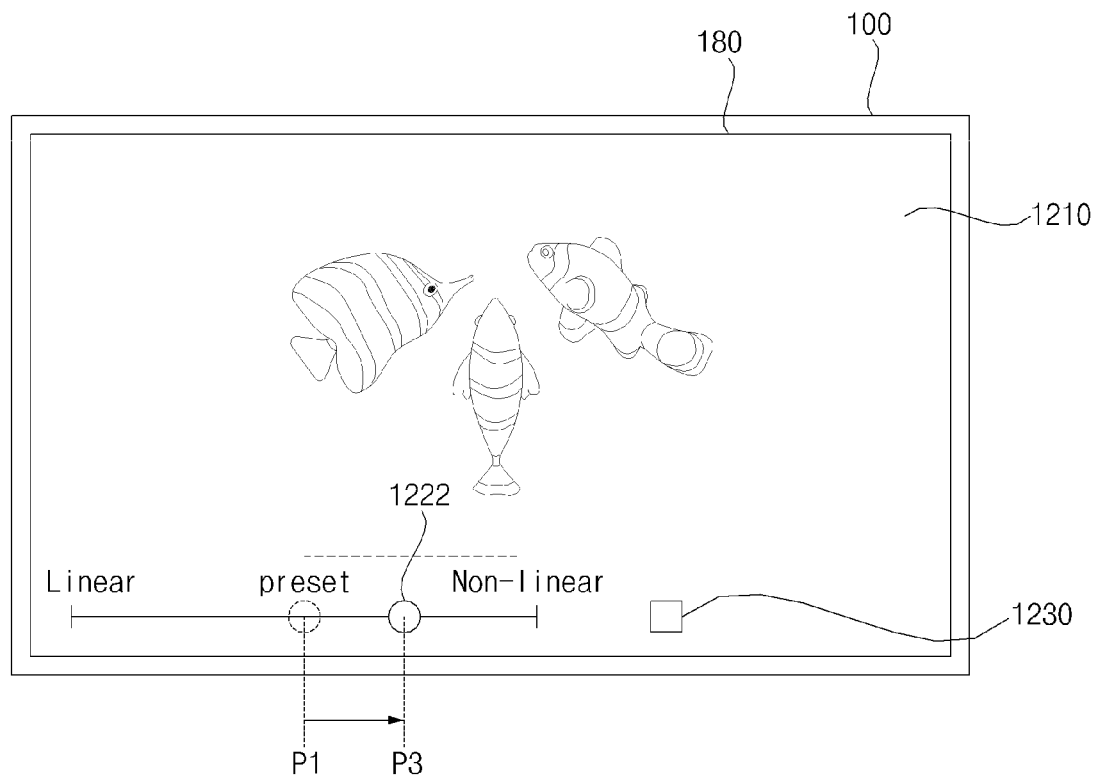
Figure 14B:
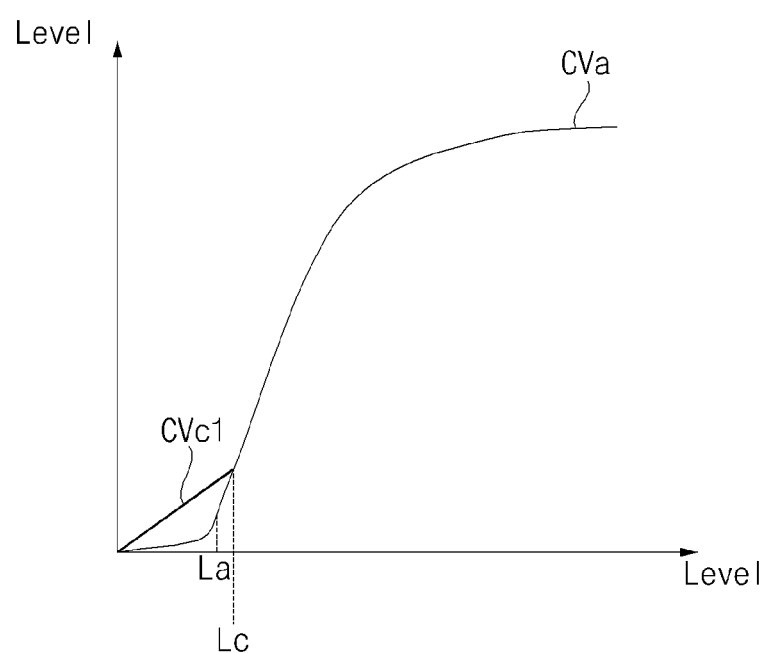

For another example, as the selection bar 1222 in the first object 1220 is positioned closer to the non-linear tone mapping item than the linear tone mapping item, as shown in FIG. 14A, the non-linear tone mapping section may increase, as shown in FIG. 14B.

FIG. 14A shows an example in which the selection bar 1222 moves from a middle position P1 to a position P2 that is further closer to the non-linear tone mapping item.

Accordingly, the non-linear tone mapping section may increase, as shown in FIG. 14B.

FIG. 14B shows an example of a linear tone mapping curve CVa and a non-linear tone mapping curve CVc1. The linear tone mapping curve CVa in FIG. 14B may be the same as the linear tone mapping curve CVa in FIG. 11, but the non-linear tone mapping curve CVc1 in FIG. 14B may have a wider range and a higher level than the non-linear tone mapping curve CVb in FIG. 11 does.

In particular, non-linear tone mapping is performed for luminance equal to or lower than a third level Lc greater than the first level La in FIG. 11, according to the non-linear tone mapping curve CVc1.

Meanwhile, the slope of the non-linear tone mapping curve CVc1 may be greater than the slope of the non-linear tone mapping curve CVb in FIG. 11.

Accordingly, as the selection bar 1222 is positioned closer to the non-linear tone mapping item than the linear tone mapping item, the non-linear tone mapping section may increase and hence a luminance transformation level after the non-linear tone mapping may increase.

Meanwhile, the linear tone mapper 820 may perform linear tone mapping on luminance equal to or higher than the third level Lc, and the non-linear tone mapper 822 may perform non-linear tone mapping on luminance lower than the third level Lc. Accordingly, it is possible to map the dynamic range of an input image suitably for the display 180. In particular, it is possible to reduce an amount of calculation for tone mapping, while improving low gray level expression.

As such, since tone mapping is performed in the linear domain, color accuracy may improve. In addition, since tone mapping is performed in a non-linear domain, low gray level expression may improve.

Meanwhile, a linear tone mapping section and a non-linear tone mapping section may vary based on information on brightness, saturation, color, and the like analyzed by the image analyzer 610.

For example, the linear tone mapping section may be set to a point where expression of signal gray level necessary for processing in a linear domain is secured, and the non-linear tone mapping section may be secured by using a non-linear tone mapping result for an insufficient low-gray level range.

Meanwhile, since linear tone mapping is used, linear gamut matching is enabled and therefore color accuracy may improve.

Meanwhile, as shown in FIGS. 12 to 14B, it is possible to control a tone mapping level as much as a user wishes through a User Interface (UI). In particular, when performing tone mapping, a degree of mixing of linear tone mapping and non-linear tone mapping may be controlled and thereby a degree of improvement of intermediate gray level expression and high gray level expression as well as low gray level expression may be controlled.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed is:

1. A signal processing device comprising:
a linear tone mapper configured to perform linear tone mapping on a part of an input image;
a non-linear tone mapper configured to perform non-linear tone mapping on another part of the input image; and
a combiner configured to combine an output from the linear tone mapper and an output from the non-linear tone mapper,
wherein the linear tone mapper is configured to perform linear tone mapping on luminance equal to or higher than a first level,
wherein the non-linear tone mapper is configured to perform non-linear tone mapping on at least some luminance lower than the first level, and
wherein the linear tone mapper is configured to receive a command signal, amplify an upper limit level of a grayscale of an image signal of the input image from a second level to a third level greater than the second level based on the received command signal, and increase resolution of the amplified grayscale of the image signal based on the received command signal;
further comprising a linear gamut mapper configured to perform linear gamut mapping on the input image,
wherein the linear tone mapper is configured to perform linear tone mapping on an output from the linear gamut mapper.

2. The signal processing device of claim 1, further comprising an image analyzer configured to analyze the input image,
wherein a section to perform the non-linear tone mapping is changed based on a content type and a resolution of the analyzed image.

3. The signal processing device of claim 1, wherein the first level is changed according to an input setting signal.

4. The signal processing device of claim 1, wherein a level of output luminance after the non-linear tone mapping increases as the first level increases.

5. The signal processing device of claim 1, wherein a section to perform the non-linear tone mapping increases as the first level increases.

6. The signal processing device of claim 1, wherein the combiner is configured to change luminance between the first level and the third level based on the linear tone mapping and the non-linear tone mapping.

7. An image display apparatus comprising:
a display; and
the signal processing device according to claim 1.

8. An image display apparatus comprising:
a display; and
the signal processing device according to claim 1,
wherein the signal processing device is further configured to change a section of the non-linear tone mapping based on an image resolution of the input image, and increase the section of the non-linear tone mapping as the image resolution of the input image increases.

9. An image display apparatus comprising:
a display; and
the signal processing device of claim 1.

10. The signal processing device of claim 1,
wherein the non-linear tone mapper is configured to increase a section of the non-linear tone mapping as an average luminance level (APL) of the input image decreases.

11. An image display apparatus comprising:
a display;
a linear tone mapper configured to perform linear tone mapping on a part of the input image; and
a signal processing device configured to display a first object for controlling linear tone mapping and non-linear tone mapping, perform linear tone mapping and non-linear tone mapping on an input image according to a value set based on the first object, and perform control to display a combined image on the display,
wherein the signal processing device is configured to perform linear tone mapping on luminance equal to or higher than a first level, and perform non-linear tone mapping on at least some luminance lower than the first level, and
wherein the signal processing device is configured to receive a command signal, amplify an upper limit level of a grayscale of an image signal of the input image from a second level to a third level greater than the second level based on the received command signal, and increase resolution of the amplified grayscale of the image signal based on the received command signal;
wherein the signal processing device further comprises a linear gamut mapper configured to perform linear gamut mapping on the input image, wherein the linear tone mapper is configured to perform the linear tone mapping on an output from the linear gamut mapper.

12. The image display apparatus of claim 11, wherein the signal processing device is configured to:
    display a second object for turning on or off a mode of mixing of the linear tone mapping and the non-linear tone mapping; and
    when the second object is selected, perform the linear tone mapping and the non-linear tone mapping on the input image according to a setting of the first object capable of controlling the linear tone mapping and the non-linear tone mapping, and perform control to display a combined image on the display.

13. The image display apparatus of claim 11, wherein the signal processing device is configured to increase a section to perform the non-linear tone mapping as a selection bar in the first object is positioned closer to a non-linear tone mapping item than a linear tone mapping item.

14. The image display apparatus of claim 11, wherein the signal processing device comprises:
    a non-linear tone mapper configured to perform non-linear tone mapping on another part of the input image; and
    a combiner configured to combine an output of the linear tone mapper and an output from the non-linear tone mapper.

15. The image display apparatus of claim 14,
    wherein the signal processing device further comprises an image analyzer configured to analyze the input image,
    wherein a section to perform the non-linear tone mapping is changed based on a content type or a resolution of the analyzed image.

16. The image display apparatus of claim 14, wherein a level of output luminance after the non-linear tone mapping increases or the section to perform the non-linear tone mapping increases as the first level increases.

17. The image display apparatus of claim 11,
    wherein the signal processing device is configured to increase a section of the non-linear tone mapping as an average luminance level (APL) of the input image decreases.

* * * * *